US005548971A

United States Patent [19]
Rockenfeller et al.

[11] Patent Number: 5,548,971
[45] Date of Patent: Aug. 27, 1996

[54] METHOD FOR USE OF LIQUID/VAPOR AMMONIA ABSORPTION SYSTEMS IN UNITARY HVAC SYSTEMS

[75] Inventors: Uwe Rockenfeller; Lance D. Kirol, both of Boulder City, Nev.

[73] Assignee: Rocky Research, Boulder City, Nev.

[21] Appl. No.: 490,343

[22] Filed: Jun. 14, 1995

[51] Int. Cl.[6] .................................................. F25B 15/00
[52] U.S. Cl. ............................................ 62/324.2; 62/476
[58] Field of Search ................................. 62/324.2, 101, 62/476, 483, 486

[56] References Cited

U.S. PATENT DOCUMENTS

| | | |
|---|---|---|
| 4,106,309 | 8/1978 | Phillips . |
| 4,311,019 | 1/1982 | Rojey et al. . |
| 5,024,063 | 6/1991 | Erickson . |
| 5,157,942 | 10/1992 | Dao ............................................ 62/476 |
| 5,174,129 | 12/1992 | Kondo ........................................ 62/476 |
| 5,271,235 | 12/1993 | Phillips et al. . |
| 5,367,884 | 11/1994 | Phillips et al. . |

OTHER PUBLICATIONS

Chemical Sector Allied Corp. "Development of a Residential Gas Fired Absorption Heat Pump", Final Report, pp. 2-1-2-9; (Aug. 1985).

Modahl, R. J., et al., "Evaluation of a Commerical Advanced Absorption Heat Pump Breadboard", pp. 117–125 (1988).

Erickson, D. C., et al., "GAX Absorption Cycles–Recent Developments Have Sparked Renewed Interest", IEA Heat Pump Centre Newsletter, vol. 10, No. 4, (Dec. 1992).

*Primary Examiner*—Henry A. Bennett
*Assistant Examiner*—William C. Doerrler
*Attorney, Agent, or Firm*—Jerry R. Seiler, Esq.

[57] ABSTRACT

A liquid vapor absorption system comprises: one or more absorbers, one or more generators, and a fluid loop for directing refrigerant absorption fluid between the absorbers and generators, heat exchangers for selectively functioning as an evaporator or a condenser and cooperating with an indoor coil for recovering thermal energy, a reservoir for condensed refrigerant, a phase-change thermosyphon loop for directing condensed refrigerant from the reservoir to the heat exchange section of an absorber for removing heat of absorption, and a reversing valve means for selectively directing gaseous refrigerant to the heat exchangers functioning as a condenser, and for simultaneously directing gaseous refrigerant from the heat exchangers functioning as an evaporator to the absorber.

40 Claims, 8 Drawing Sheets

5,548,971

METHOD FOR USE OF LIQUID/VAPOR AMMONIA ABSORPTION SYSTEMS IN UNITARY HVAC SYSTEMS

BACKGROUND OF THE INVENTION

The invention relates to absorption heat pump systems and particularly to liquid/vapor absorption systems using ammonia refrigerant and water, salt, or salt and water absorbents. Thermal efficiencies of such systems have been improved during the past years by use of innovative heat recuperation within the absorber as well as between the one or more absorbers and the generator. Such improvements use absorber heat exchangers as well as generator/absorber heat exchange facilitated by use of the rich or weak absorption working fluid or by separate heat exchange loop. Detailed descriptions on the use and implementation can be found in U.S. Pat. Nos. 4,311,019, 5,024,063, 5,271,235, 5,367,884; R. J. Modahl and F. C. Hayes, "Evaluation of Commercial Advanced Absorption Heat Pump Breadboard", The Trane Company pp. 117–125, 1988, as well as numerous other publications. While all of the above improvements are intended to increase the rating or seasonal thermal efficiency of the absorption system, the use of ammonia, a class 2 refrigerant, prohibits the use of a direct expansion coil in the indoor air handler by safety code and calls for an intermediate coupling loop with an environmentally acceptable and safe fluid for heat transfer, which in turn calls for additional components and reduces the overall efficiency due to pump power consumption and heat transfer inefficiencies.

The prior art ammonia absorption systems reject heat at various components involving at least the condenser and absorber and often also the rectifier/analyzer in the generator unless such rectification is performed by liquid refrigerant feed back rather than a heat exchanger coil as disclosed for example in U.S. Pat. No. 4,106,309. Heat rejection from the ammonia absorption system is obtained by routing the secondary brine through the sorption cycle components rejecting heat, i.e. absorber, condenser and often generator/analyzer. The cooling interface is obtained by routing the secondary brine between the evaporator and the coil extracting heat from the ambient air which is typically the indoor coil in building cooling applications and outdoor coil in building heating applications. As shown and disclosed in "Development of a Residential Gas Fired Absorption Heat Pump", Chemical Section Allied Corporation, August, 1985 and U.S. Pat. No. 5,367,884 switching from heating to cooling can be performed by use of an eight-way valve in the brine/glycol loop, which connects the indoor and outdoor coil with all heat rejecting and heat absorbing components of the sorption cycle. Since one brine must serve both the indoor and outdoor coil under all climate conditions ranging from winter heating at low outdoor temperatures as low as −10° F. or −20° F. to summer cooling at high outdoor temperatures as high as 100° F. to 120° F., such brine not only needs to be designed to be safe to avoid destruction of pumps and coils but also effective as heat transfer fluid over the entire temperature range of operation. The use of the brine itself for thermal communication with the indoor and outdoor coil results in energy efficiency losses due to the additional heat transfer gradients required to move energy into and out of the brine. In addition, brine outdoor heat exchanger coils are larger than those required for direct refrigerant condensation or evaporation and also call for more pressure losses on the air-side of such coils not to mention the pump power requirements to move the brine through the outdoor heat exchanger and all heat rejecting cycle components in the cooling mode or the evaporator in the heating mode.

One of the main challenges for absorption heat pumps is to meet the building load imposed capacity at extreme outdoor temperature conditions. The heat transfer gradients to move energy from and to the brine/glycol increases the required temperature lift between the one or more evaporators and the heat rejecting components of the sorption cycle by about 15° F. to 30° F. thus reducing capacity and efficiency. If operational conditions call for a switch from heating to cooling or vice versa during the operating hours of a day the thermal capacity of the brine/glycol may add to cycling losses.

According to the present invention simplified methods connect and operate liquid/vapor absorption systems comprising at least one evaporator, condenser, absorber and generator with building HVAC indoor and outdoor coils including the use of plumbing and internal heat exchange configurations to reduce the interface of heat exchange between the indoor/outdoor coils and the absorption system to one interface involving the evaporator and only one interface involving either the absorber or condenser for all heat rejection of the absorption system. Such configuration includes the use of heat transfer between at least the absorber and condenser as well as a refrigerant reversing valve to separate the indoor and outdoor coils and loops and to allow for direct refrigerant exposure in the outdoor coil thus eliminating an outdoor brine or glycol loop, elimination of which leads to cost reduction and energy performance enhancement.

The present invention will eliminate the inherent prior art inefficiencies described above by reducing the heat rejection interface between the sorption cycle and the outdoor heat exchanger to one sorption cycle component which in turn allows for use of reversing valve hardware which enables the functional switch of condenser and evaporator and makes it possible to use the refrigerant itself to transfer heat from and to the outdoor coil thus only requiring an intermediate heat transfer loop for the indoor coil, the operating temperature band of which is much narrower which allows for use of a more optimized, less viscous brine than possible if such brine had to serve both indoor and outdoor coils.

SUMMARY OF THE INVENTION

To achieve these and other advantages, and in accordance with the purpose of the invention as described herein, the invention includes heat exchangers and conduits within the sorption cycle to define preferably only one heat rejection interface with the outdoor coil. Since the equipment has to serve heating and cooling utilities, a single interface with the outdoor unit requires a functional switch of the one interface depending on whether cooling or heating is required. This functional switch is facilitated similar to the methods used in vapor compression units by use of a reversing valve mechanism such as a four-way valve capable of handing the refrigerant used at operating temperatures and pressures. While vapor compression systems are designed to exchange useful heat via condenser and evaporator only, absorption systems have the complication that a good portion of the heat is generated in the absorber. In order to allow for efficient operation using such reversing valve means in absorption cycles, it is not only necessary to reduce the points of heat rejection to the condenser, but it is also necessary to employ either a reservoir pump or vertical stacking of components to provide condensed refrigerant for phase change thermosyphon heat transfer among components. The pump, if used, can be mechanical or any type of vapor or heat driven pump. In addition, the condenser and evaporator designs have to allow for both functions, if switching is anticipated for heat pumping, a design feature not required by the prior art technology.

The separation of indoor and outdoor unit heat transfer interface not only eliminates the need for a secondary brine between the sorption cycle and the outdoor coil, but also allows for use of a more efficient brine for interface with the indoor coil only since the operating temperature range of the indoor coil is limited to about 33° F. to 140° F. Freeze point protection is only required for safety without need to operate at low temperatures, and less viscous fluids can be employed. It is also possible to use an environmentally acceptable phase change material, e.g. HFC, for heat transfer in this secondary loop even though such material may not be generally suitable in vapor compression processes.

In summary, the following is required to facilitate separation of heat transfer to outdoor and indoor heat exchanger coils:

heat transfer means between condenser and absorber, and in some applications between condenser and analyzer in generator directly or via absorber, pumping means to facilitate phase change heat transfer between condenser and absorber and possibly analyzer/generator, such means being a bubble pump, mechanical pump or thermosyphon using gravity, substantially similar or identical design features for condenser and evaporator if system is used for heating and cooling which requires switch of function between evaporator and condenser, a reversing valve means, e.g. four way valve, to facilitate the switching of evaporator and condenser function, the outer coil being also the condenser/evaporator itself if the sorption system refrigerant is used itself to communicate with the outdoor loop or two separate loops if indoor and outdoor coil are supplied with indirect heat transfer, and refrigeration expansion devices which allow either heat exchanger to operate as a condenser or evaporator.

The system of the present invention is designed to accomplish the aforesaid requirements.

DETAILED DESCRIPTION

In FIGS. 3–8, the solution flow pathway including solution pump, absorber heat exchanger, generator heat exchanger, as well as any GAX fluid pathway using all or a portion of the liquor or a separate heat exchange loop is intentionally omitted as the present invention is not limited to any specific GAX or non-GAX cycle configuration.

Figure 1:
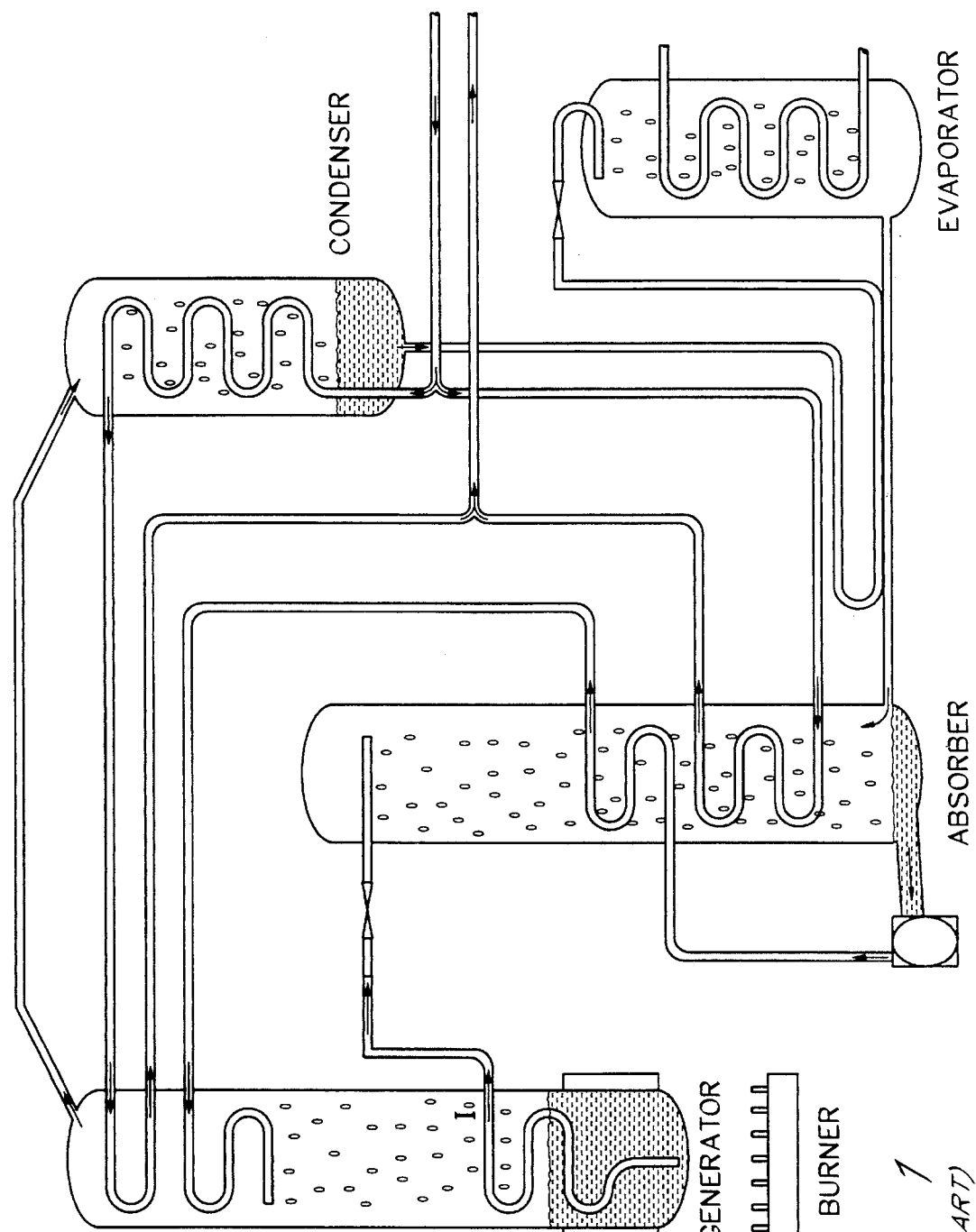
FIG. 1 illustrates a prior art absorption cycle apparatus using an absorber heat exchanger as shown in U.S. Pat. No. 5,367,884.
Figure 2:
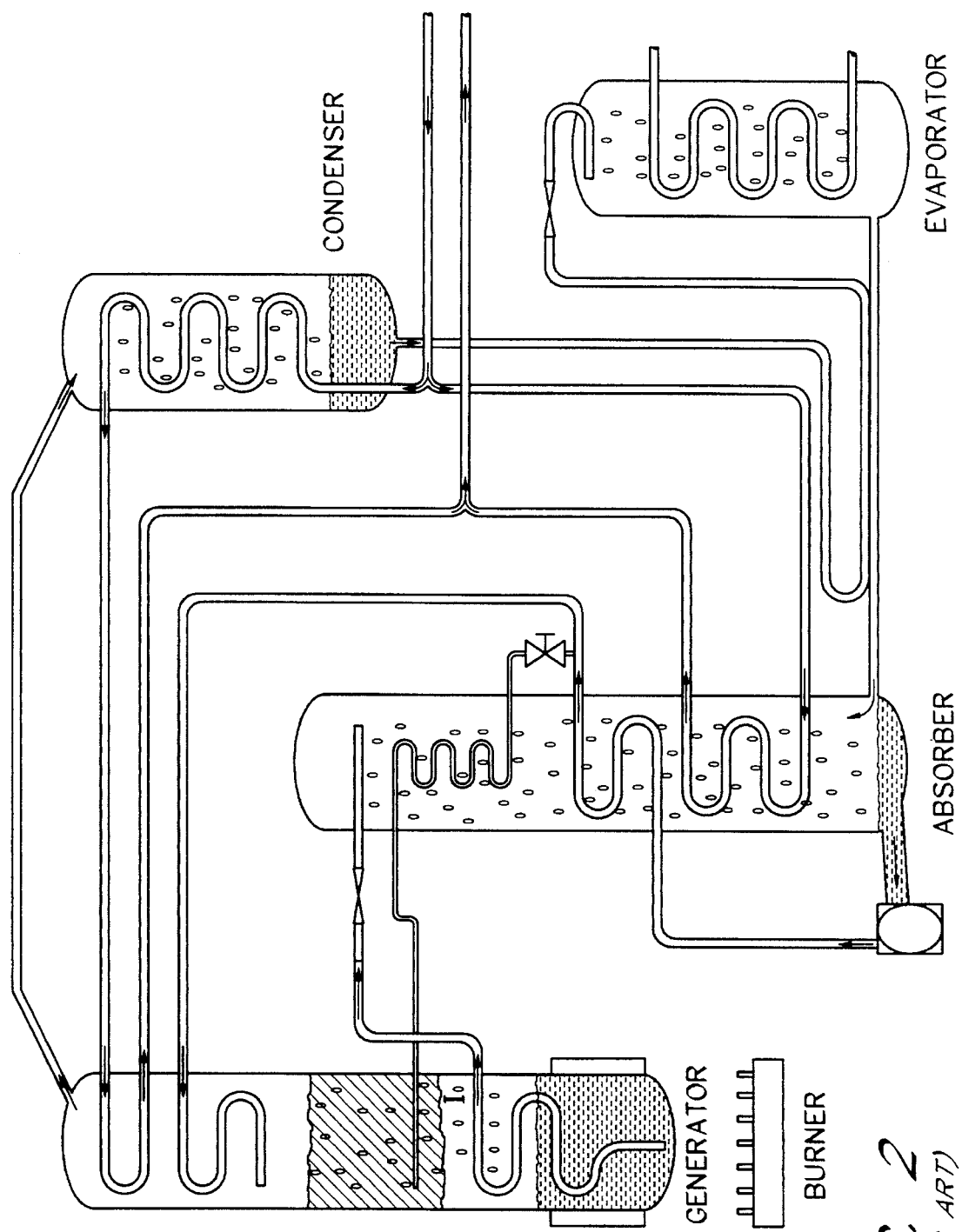
FIG. 2 is a prior art GAX absorption cycle apparatus shown and described in U.S. Pat. No. 5,367,884 using an absorber heat exchanger and a GAX heat exchange mechanism employing the rich liquor.
Figure 3:
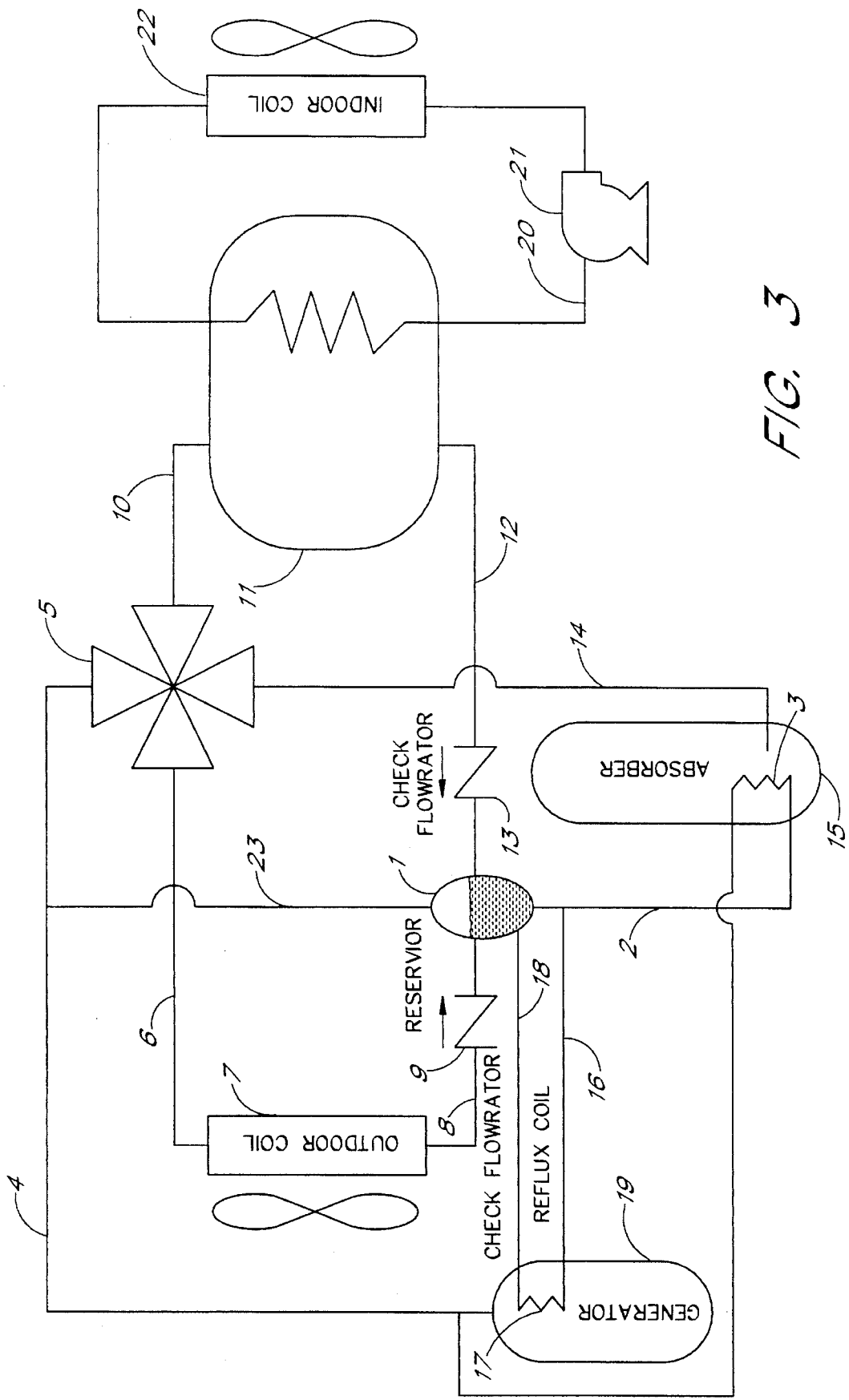
FIG. 3 schematically illustrates the baseline cycle apparatus of the present invention, with the phase-change thermosyphon heat exchange for transferring all reject heat to the condenser.

FIG. 3 shows a basic cycle apparatus according to this invention. The main feature of this cycle is that phase change ammonia heat transfer is used to combine all heat rejection from the cycle into a single fluid stream so that a conventional reversing valve (4-way valve) can be used to switch between heating and cooling modes.

Condensed ammonia is collected in a reservoir 1. Liquid ammonia is allowed to flow from the reservoir through conduit 2 to a heat transfer coil 3 in the absorber 15. In this coil, ammonia is fully or partially vaporized. Vapor, with possibly some entrained liquid, flows from coil 3 through conduit 4 to reversing valve 5. In cooling mode, the reversing valve directs vapor through conduit 6 to the outdoor coil 7, where the vapor is condensed. Liquid ammonia leaves the outdoor coil through conduit 8, passes through checkflowrator 9, which imposes virtually no flow restriction in this direction, and back to reservoir 1. Liquid ammonia also leaves reservoir 1 through checkflowrator 13 which functions as an expansion valve in the direction from the reservoir to conduit 12 and to heat exchanger 11 where it is vaporized. Vaporization of ammonia in heat exchanger 11 cools heat transfer fluid, which in turn imparts cooling to the house or space to be air conditioned via indoor coil 22. Heat transfer loop 20 connecting heat exchanger 11 with the coil 22 in the conditioned space could also utilize phase change of almost any environmentally acceptable refrigerant instead of a pumped loop as drawn. Examples of suitable heat transfer fluids used in the indoor heat transfer loop include glycol-water, salt-water, and phase-change materials such as HFCs and HCFCs, etc. Vaporized ammonia exits heat exchanger 11 through conduit 10 to reversing valve 5. The valve directs vapor to conduit 14 which in turn carries the vapor to absorber 15, where it is absorbed into the ammonia-water solution.

In heating mode, the functions of heat exchanger 11 and outdoor coil 7 are reversed by changing the position of reversing valve 5. Vapor from conduit 4 is now directed into conduit 10 and heat exchanger 11, where it is condensed, and returned to reservoir 1 through conduit 12 and checkflowrator 13. Simultaneously, liquid flows through checkflowrator 9, where it flashes to evaporator pressure, and conduit 8 to outdoor coil 7. Vapor from coil 7 is routed to absorber 15 through conduit 6, valve 5, and conduit 14. In this mode, heat exchanger 11 functions as the condenser and heats the hydronic loop 20, which in turn heats the house via indoor coil 22. Outdoor coil 7 functions as the evaporator, picking up heat energy from ambient air.

In both heating and cooling modes, phase change heat transfer can also be used to generate reflux in the generator, provided the liquid in reservoir 1 is slightly subcooled. Liquid is allowed to flow through conduit 16 to reflux coil 17, where the liquid is warmed and possibly partially vaporized while condensing vapor inside the generator 17 and providing reflux for distillation. Two phase fluid, or slightly warmed liquid, from the reflux coil 17 is returned to the reservoir through conduit 18. Thus a thermosyphon operates between the receiver and reflux coil and transfers heat from the coil to the reservoir. The temperature of the reservoir is maintained below saturation by a continuous supply of subcooled liquid from the condenser. An optional vent line 23 can be provided on the reservoir to allow vapor to easily flow from the receiver to the condenser.

Plumbing as described for the FIG. 3 baseline apparatus combines vapor from the generator which must be condensed with vapor generated by heat removal from the absorber, and with heat removal at the reflux coil. The cycle has three points at which heat must rejected, and this invention combines them into a single vapor stream which can then be routed to a condenser with a conventional reversing valve. The basic cycle of FIG. 4 relies on gravity to drive heat exchange loops between the absorber and condenser and between the reflux coil and condenser. Thus, both heat exchanger 11 and outdoor coil 7 must be located above absorber 15 and reflux coil 17. Although reservoir 1 is shown for receiving the refrigerant, instead of providing such a vessel the system may be designed whereby the refrigerant conduits themselves comprise the reservoir for the condensed refrigerant.

Figure 4:
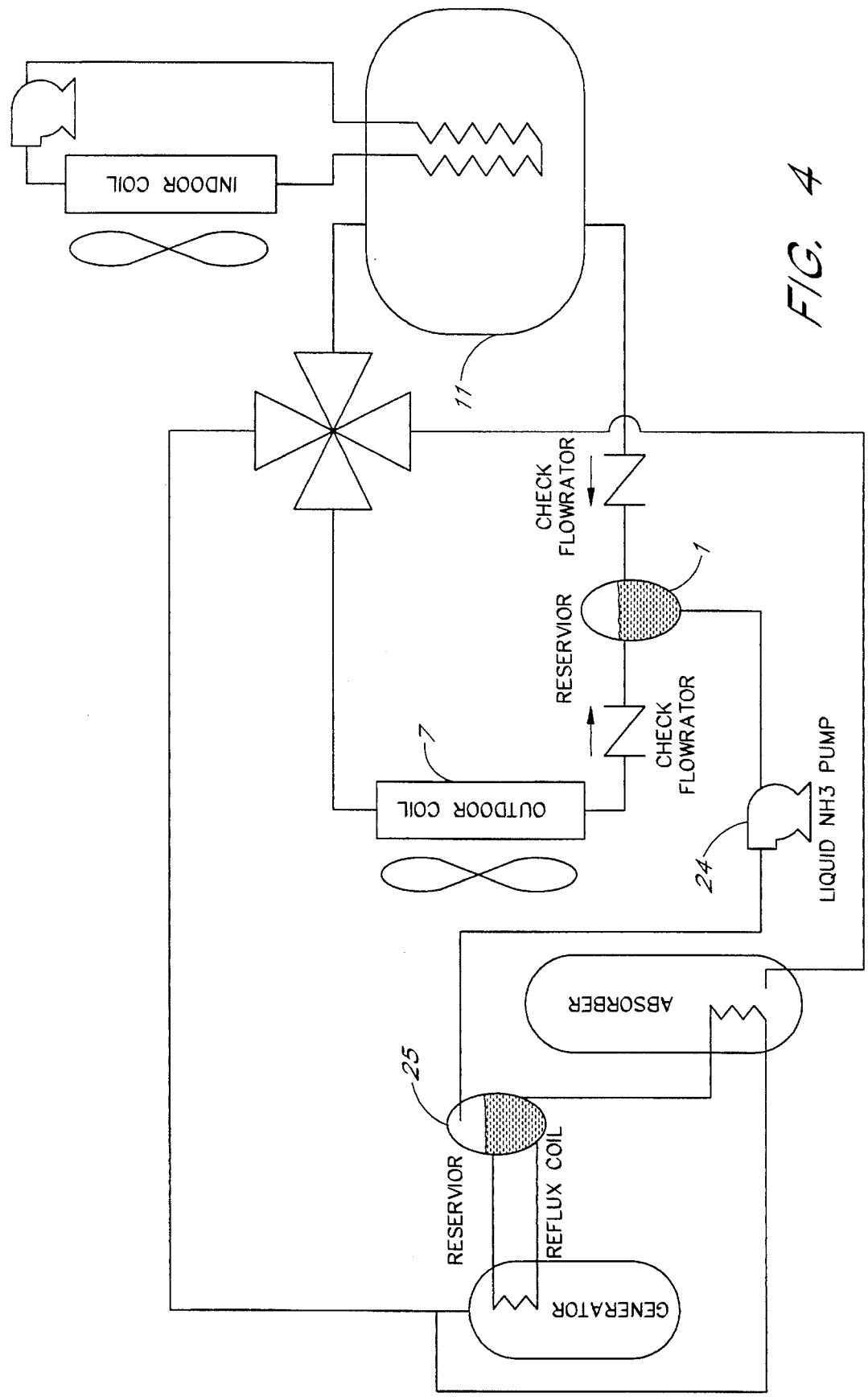
FIG. 4 is a modification of the apparatus of FIG. 3 to remove restrictions on relative elevations of components.

The system shown in FIG. 4 is similar to FIG. 3 with added components being pump 24 and second reservoir 25. Liquid ammonia is pumped from reservoir 1 to reservoir 25 thereby eliminating the gravity drive of FIG. 3. The assembly of components comprising outdoor coil 7, heat exchanger 11, reservoir 1, with connecting valves and conduits can now be located at any elevation relative to the condenser and absorber. Reservoir 25 must be above the heat exchanger coil in the bottom of the absorber, and roughly at the same elevation as the reflux coil in the generator. Again, either or both of the reservoirs, shown as vessels, may be replaced or modified by using the conduits as reservoirs for receiving the refrigerant. For example, reservoir 25 may be eliminated and a flow splitter provided for directing the refrigerant as shown.

Figure 5:
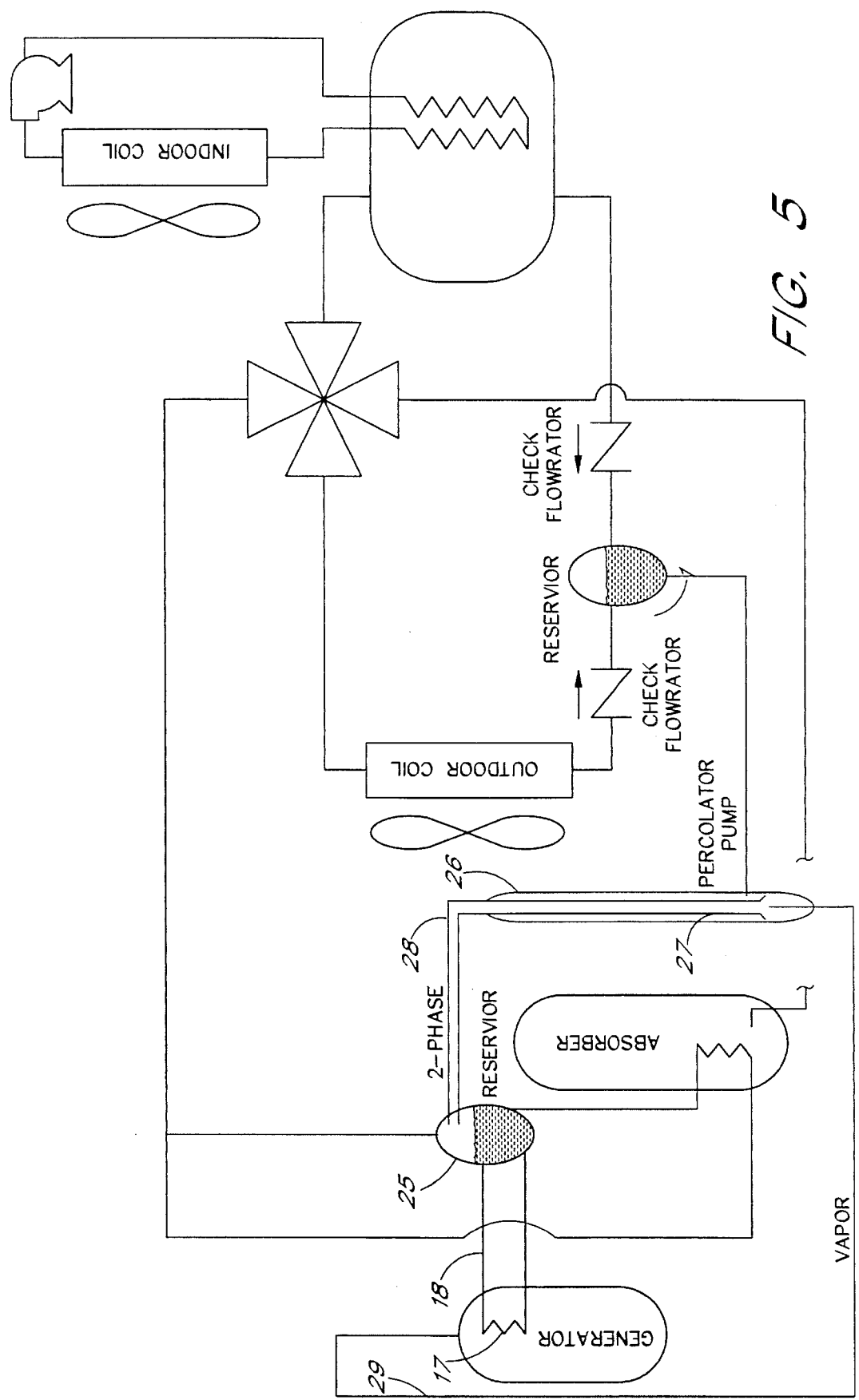
FIG. 5 is a modification of the apparatus shown in FIG. 4 to replace a mechanical liquid ammonia pump with a percolator pump.

The mechanical liquid ammonia pump shown in FIG. 4 may be replaced with vapor-driven or heat-driven pumps of any variety. FIG. 5 shows one example in which a percolator or "bubble pump" is utilized. Percolator pumps typically comprise a housing 26 with standing liquid level, and a riser 27. Vapor is injected into the bottom of the riser, and entrains liquid. The two phase mixture is carried up the riser and to reservoir 25 via conduit 28. Vapor to drive the percolator is supplied by the generator. However, the cycle shown in FIG. 5 requires that the generator operates at slightly higher pressure than the percolator and condenser. This is necessary because the liquid in receiver 25 is at saturation temperature. Thus the generator must be at a higher temperature in order for coil 17 to generate reflux in the generator. With the generator at higher temperature, the fluid in reflux coil 17 can be fully evaporated, and conduit 18 can be connected to the receiver as shown, or to a vapor line leading to the reversing valve.

Figure 6:
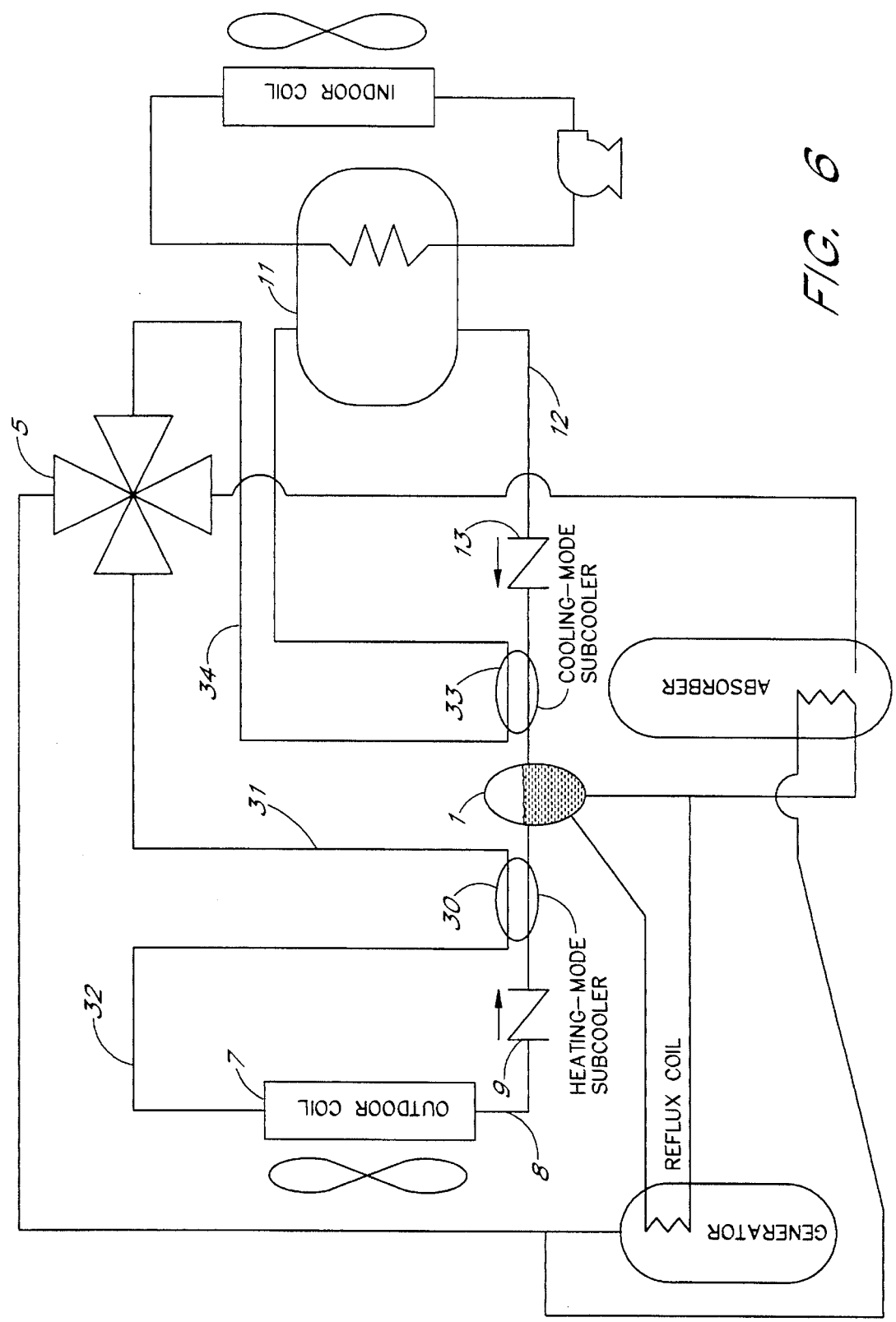
FIG. 6 shows a modification of the apparatus of FIG. 3 to include subcoolers.

In FIG. 6 the apparatus is modified to include subcoolers to improve cycle efficiency and capacity. This embodiment is drawn as an option to the system of FIG. 3, but is equally applicable to systems of FIGS. 3, 4, or 5. Heat exchangers or subcoolers 30 and 33 are added between reservoir 1 and checkflowrators 9 and 13. In cooling mode, cold ammonia vapor leaving heat exchanger 11, which is the evaporator for cooling mode, is routed through conduit 35 to subcooler 33. Liquid ammonia is also flowing from receiver 1 through subcooler 33, to checkflowrator 13, and on to evaporator 11. This liquid stream is subcooled in 33 while the vapor stream is heated. Superheated vapor flows from subcooler 33, through conduit 34, and to reversing valve 5. Subcooling the liquid prior to flashing to evaporator pressure at checkflowrator 13 increases cooling obtained from a fixed mass flowrate of refrigerant, as is well known by those skilled in the art.

In cooling mode, subcooler 33 functions as described above, and subcooler 30 serves no function. Vapor from the generator routed to the subcooler through reversing valve 5 and conduit 31 is at virtually the same temperature as liquid entering the subcooler from the condenser (outdoor coil 7), so no heat is transferred. In heating mode, the outdoor coil 7 is the evaporator and subcooler 30 is functional, while subcooler 33 becomes non functional. Both subcoolers need not be included in any given hardware manifestation. Most applications would only use the cooling mode subcooler 33, and heating mode subcooler 30 would not be included. Both are shown in FIG. 6 for completeness. The application of subcoolers is only shown for the baseline system of FIG. 3, but may also be used with the systems illustrated in FIGS. 4 or 5.

Figure 7:
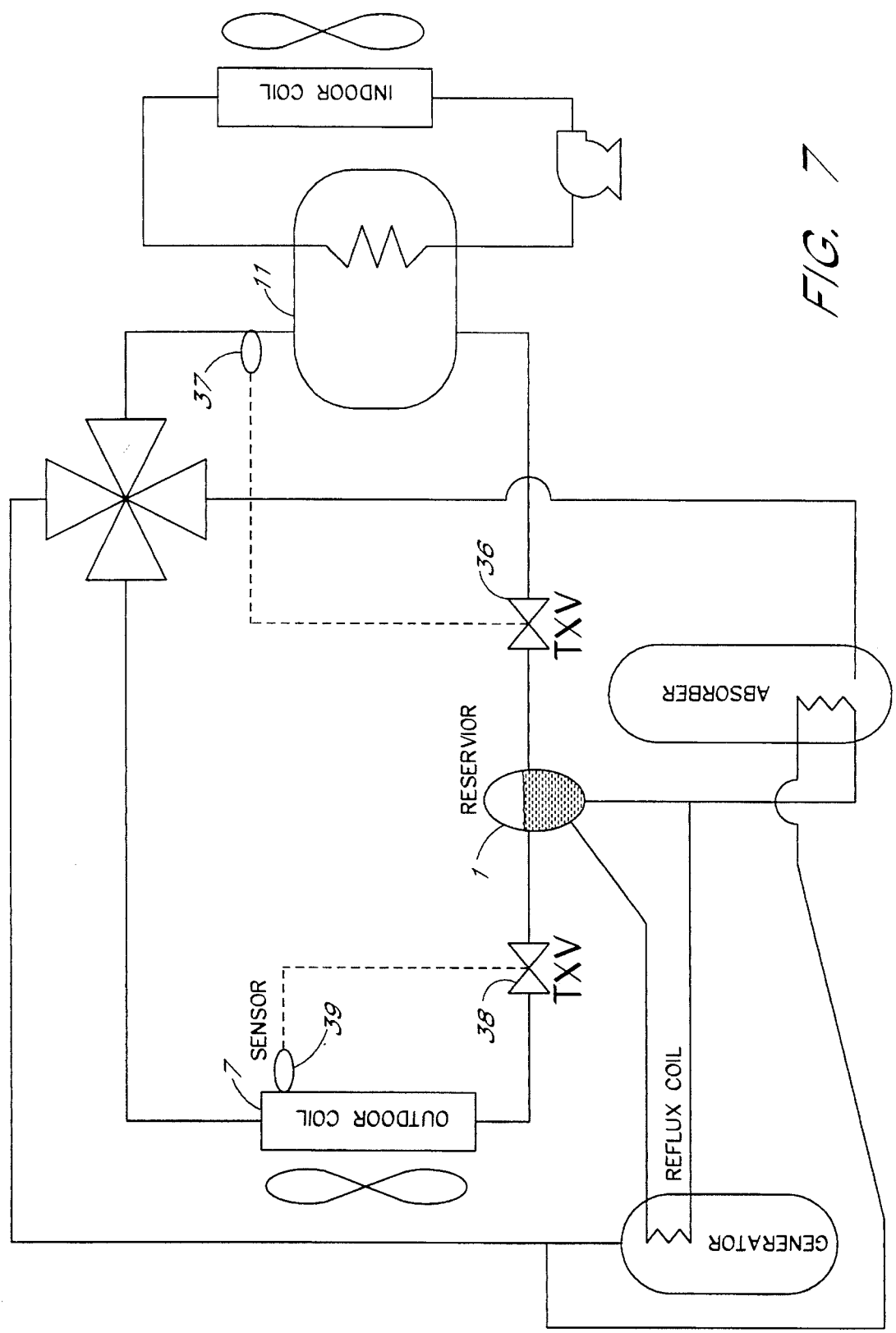
FIG. 7 is a modification of the apparatus of FIG. 3 using TXVs instead of checkflowrators.

FIG. 7 illustrates an embodiment of the FIG. 3 system in which checkflowrators are replaced by thermostatic expansion valves (TXVs). The valves can be of the mechanical type, using gas or refrigerant charged bulbs to sense superheat in the vapor leaving the evaporator, or of the electronic type. Two TXVs 36 and 28 are shown in FIG. 7. Each valve has its own sensing device, 37 and 39, respectively. With the system in cooling mode, heat exchanger 11 is the evaporator. Bulb 37 controls valve 36 so the proper amount of refrigerant enters the evaporator to maintain the desired superheat at the outlet, where sensor 37 is located. Thus the sensor and valve combination functions as a typical TXV. While in cooling mode coil 7 is the condenser. The vapor entering coil 7 has little or no superheat, so sensor 39 causes valve 38 to open. With valve 38 open, liquid is allowed to drain from the condenser to reservoir 1.

During heating mode operation with coil 7 as the evaporator and heat exchanger 11 as the condenser, the function of the TXVs is reversed. Valve 36 opens to allow condenser 11 to drain, and sensor 39 causes valve 38 to admit the proper amount of refrigerant to evaporator 7. The embodiment of FIG. 7 works with system configurations illustrated in FIGS. 3, 4, 5, or 6.

Figure 8:
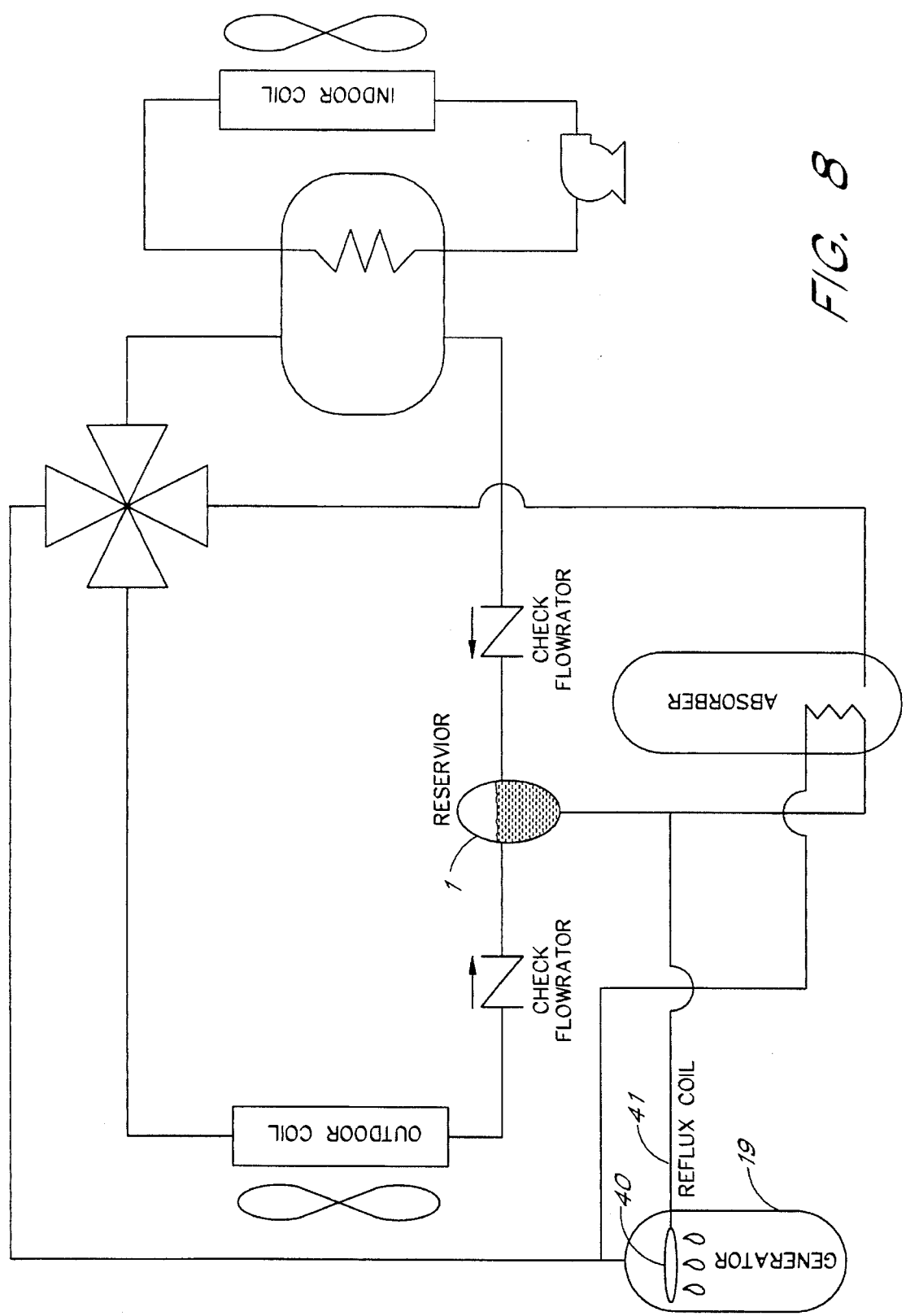
FIG. 8 is a modification of the apparatus of FIG. 3 using liquid reflux instead of a reflux coil inside the generator.

FIG. 8 shows an embodiment of the apparatus in which the heat exchanger to generate reflux within the rectification section of the generator 19 is replaced with a distributor 40 for supplying liquid ammonia as reflux. Reflux is supplied from reservoir 1 through conduit 41. Use of reflux returned to the generator from the condenser circuit will usually require a flow control valve (not shown) to maintain the proper flow of reflux. Too little reflux will result in too much water in the vapor exiting the generator, and too much reflux will cause excessive energy consumption in the generator. The main advantage of external reflux is that fluid cooler than the exit of the generator is not required. Liquid ammonia at saturation temperature, or even two phase ammonia, will provide the necessary reflux for distillation. This is especially advantageous when used with a percolator or other vapor pump per the FIG. 4 system, because with this system it is not possible for the liquid collected in the reservoir to be significantly subcooled.

Ammonia refrigerant absorption fluids used in the apparatus of the invention are well known in the art. Examples of such fluids include water, water-ammonia, ammonia-salt and water-ammonia-salt solutions. Preferred metal salts are chlorides, bromides, iodides, hydroxides, nitrates, thiocyanates and cyanates and mixtures thereof. Alkali metal salts and particularly lithium are also preferred. Such absorption fluids also preferably incorporate heat and mass transfer additives. The fluids may also contain corrosion inhibitors, for example, chromates, nitrates, tungstates, molybdates, borates and silicates where water is the refrigerant, combinations of metal hydroxides or lithium-zinc halides or lithium-zinc-calcium halides may be used as the absorbent.

We claim:

1. A liquid vapor absorption system comprising:
   one or more absorbers having a heat exchange section, one or more generators containing a refrigerant absorption fluid, and a fluid loop for directing refrigerant absorption fluid therebetween,
   one or more first heat exchangers for selectively functioning as an evaporator or a condenser and one or more second heat exchangers for selectively functioning as a condenser or an evaporator and cooperating with an indoor coil for recovering thermal energy from said one or more second heat exchangers,
   a reservoir for condensed refrigerant, and first conduit means for directing condensed refrigerant between said reservoir and said one or more first heat exchangers and second conduit means for directing condensed refrigerant between said reservoir and said one or more second heat exchangers,
   a phase-change thermosyphon loop for directing condensed refrigerant from said reservoir to the heat exchange section of said absorber for removing heat of absorption therefrom, and
   reversing valve means for selectively directing gaseous refrigerant to the said one or more first heat exchangers or said one or more second heat exchangers functioning as a condenser, and for simultaneously directing gaseous refrigerant from the said one or more first heat exchangers or said one or more second heat exchangers functioning as an evaporator to the absorber for absorption therein.

2. The system of claim 1 wherein said thermosyphon loop includes one or more conduits cooperating with the heat exchange section of said one or more absorbers and said generator for directing combined refrigerant vapor therefrom to said reversing valve means.

3. The system of claim 1 wherein said reversing valve means comprises a four-way valve for selectively reversing the functions of said one or more first heat exchangers and said one or more second heat exchangers.

4. The system of claim 1 including a second phase-change thermosyphon loop comprising a reflux coil in said generator and a conduit loop cooperating therewith for directing condensed refrigerant between said reflux coil and said reservoir.

5. The system of claim 4 comprising a first reservoir for receiving condensed refrigerant from said one or more first heat exchangers and said one or more second heat exchangers, and a second reservoir cooperating with said conduit loop and said reflux coil.

6. The system of claim 5 including third conduit means for directing condensed refrigerant from said first reservoir to said second reservoir and a pump cooperating therewith for pumping said refrigerant.

7. The system of claim 6 wherein said pump comprises a refrigerant vapor driven pump.

8. The system of claim 6 wherein said pump comprises a mechanical pump.

9. The system of claim 4 comprising a first reservoir for receiving condensed refrigerant from said one or more first heat exchangers and said one or more second heat exchangers, and a flow splitter cooperating with said conduit loop and said reflux coil.

10. The system of claim 1 including a first control valve along said first conduit means for controlling the flow of refrigerant from said reservoir to said one or more first heat exchangers, and a second control valve along said second conduit means for controlling the flow of refrigerant from said reservoir to said one or more second heat exchangers.

11. The system of claim 10 wherein at least one of said first and second control valves comprises a checkflowrator for restricting the flow of refrigerant from said reservoir to said heat exchangers, respectively, and providing unrestricted flow of refrigerant from a heat exchanger to the reservoir.

12. The system of claim 5 including a first control valve along said first conduit means for controlling the flow of refrigerant from said first reservoir and said one or more first heat exchangers, and a second control valve along said second conduit means for controlling the flow of refrigerant from said first reservoir and said one or more second heat exchangers.

13. The system of claim 10 including a subcooler for heat exchange between condensed refrigerant directed along said first conduit means and gaseous refrigerant directed to said first heat exchanger.

14. The system of claim 10 including subcooler for heat exchange between condensed refrigerant directed along said second conduit means and gaseous refrigerant directed to said second heat exchanger.

15. The system of claim 10 including a first subcooler for heat exchange between condensed refrigerant directed along said first conduit means and gaseous refrigerant directed to said first heat exchanger, and a second subcooler for heat exchange between condensed refrigerant directed along said second conduit means and gaseous refrigerant directed to said second heat exchanger.

16. The system of claim 10 wherein at least one of said first and second control valves comprise thermostatic expansion valves and sensors cooperating therewith for restricting refrigerant flow from the reservoir to the evaporator and providing unrestricted refrigerant flow from the condenser to the reservoir.

17. The system of claim 10 wherein said control valves comprise electronic expansion valves.

18. The system of claim 1 including a reflux line for directing condensed refrigerant from said reservoir or said thermosyphon loop to said generator.

19. The system of claim 18 comprising a first reservoir for receiving condensed refrigerant from said one or more first heat exchangers and said one or more second heat exchangers, and a second reservoir cooperating with said reflux line and the absorber.

20. The system of claim 19 including third conduit means for directing condensed refrigerant from said first reservoir to said second reservoir and a pump cooperating therewith for pumping said refrigerant.

21. The system of claim 10 comprising a first reservoir for receiving condensed refrigerant from said one or more first heat exchangers and said one or more second heat exchangers, and a second reservoir cooperating with said conduit loop.

22. The system of claim 21 including third conduit means for directing condensed refrigerant from said first reservoir to said second reservoir and a pump cooperating therewith for pumping said refrigerant.

23. The system of claim 22 including a reflux coil for directing condensed refrigerant from second reservoir or said thermosyphon loop to said generator.

24. The system of claim 22 including a reflux line for directing condensed refrigerant from second reservoir or said thermosyphon loop to said generator.

25. The system of claim 1 wherein said one or more first heat exchangers comprises an outdoor coil.

26. The system of claim 1 including a heat transfer loop cooperating with said one or more second heat exchangers and said indoor coil for directing a heat transfer fluid therebetween.

27. The system of claim 1 wherein said system is a refrigeration or heat pump system.

28. The system of claim 26 wherein said refrigeration or heat pump system is a single-stage absorption system or a generator-absorber heat exchange system.

29. The system of claim 1 wherein said one or more second heat exchangers comprises said indoor coil.

30. The system of claim 1 wherein said refrigerant is ammonia and said absorption fluid comprises water.

31. The system of claim 30 wherein said absorption fluid comprises an ammonia metal salt solution and water.

32. The system of claim 31 wherein said metal salt comprises a chloride, bromide, hydroxide, nitrate, thiocyanate, cyanate or mixtures thereof.

33. The system of claim 1 wherein said absorption fluid comprises an ammonia metal salt solution.

34. The system of claim 33 wherein said metal salt comprises a chloride, bromide, hydroxide, nitrate, thiocyanate, cyanates or mixtures thereof.

35. The system of claim 1 wherein said absorption fluid includes a heat and mass transfer additive.

36. A system of claim 1 wherein said absorption fluid includes a corrosion inhibitor.

37. The system of claim 30 wherein said absorption fluid comprises an aqueous metal salt solution.

38. The system of claim 37 wherein said metal salt comprises one or more metal hydroxide or lithium zinc or lithium zinc calcium mixtures.

39. The system of claim 37 wherein said absorption fluid includes a heat and mass transfer additive.

40. A system of claim 37 wherein said absorption fluid includes a corrosion inhibitor.

* * * * *